July 9, 1929.  P. BRÜHL  1,719,964
GRINDING MACHINE
Filed Sept. 30, 1927  11 Sheets-Sheet 1

July 9, 1929.   P. BRÜHL   1,719,964
GRINDING MACHINE
Filed Sept. 30, 1927   11 Sheets-Sheet 4

July 9, 1929.　　　　P. BRÜHL　　　　1,719,964
GRINDING MACHINE
Filed Sept. 30, 1927　　11 Sheets-Sheet 7

July 9, 1929.  P. BRÜHL  1,719,964
GRINDING MACHINE
Filed Sept. 30, 1927   11 Sheets-Sheet 9

July 9, 1929.  P. BRÜHL  1,719,964
GRINDING MACHINE
Filed Sept. 30, 1927    11 Sheets-Sheet 10

Patented July 9, 1929.

1,719,964

UNITED STATES PATENT OFFICE.

PAUL BRÜHL, OF DUSSELDORF, GERMANY.

GRINDING MACHINE.

Application filed September 30, 1927, Serial No. 223,133, and in Germany October 11, 1926.

My invention relates to grinding machines and more particularly to machines for grinding round blanks, rollers or rolls, in which the blanks are displaced in succession between two grinding plates, being fed along a passage formed by corresponding grooves in the grinding plates. The plates are stationary or adapted to be displaced with respect to each other in the longitudinal direction of the passage, and means are provided for turning the blanks about their axes outside the passage so as to vary their points of attack with respect to the grinding passage faces.

It is an object of my invention to increase the output of a machine of this type, and for this purpose I provide a plurality of grinding passages instead of a single passage.

It has been found that the existing single-passage machines are comparatively slow in turning out finished blanks, as during each grinding movement the machine grinds practically only those blanks which are of the largest size and the number of blanks which are being fed toward, or away from, the passage, is considerably in excess of that number which is being ground.

By increasing the number of passages the number of large-sized blanks being ground per unit of time is increased in proportion so that each large-sized blank is finished in a much shorter time than in the single-passage machines and the time for finishing a given set of blanks is much reduced.

It will be understood that the essence of my invention is in the fact that the blanks are no longer fed through a single passage, and returned to the same end of the passage but that they are moved in succession on a sinuous or serpentine path through two or more grinding passages, and preferably from opposite ends. By thus constructing a grinding machine a very favourable ratio of blanks is always being ground between the grinding plates and it may be relied on that large-sized blanks will be present at any time between the grinding plates. Furthermore it is important that in such a machine the blanks enter the passages alternately with opposite ends on and are therefore ground in opposite directions so that any irregularities between the ends of the blanks as may occur when grinding, and particularly when grinding with a mixture of emery and oil, are removed.

In operation, each blank is, after moving through one of the grinding passages, displaced transversely and introduced into the next passage from its opposite end. Various means may be provided for moving the blanks through the passages, for instance, a "cage" constituted by a belt recessed for the blanks at its edges, or the blanks may be fed by means of push rods which are introduced at the ends of the passages so as to engage the last blank in each passage, and each blank pushes the one in front of it forward. Means may also be provided for positively feeding the blanks not only between the grinding plates but also intermediate them, and a mixing device may be arranged in the path of the blanks intermediate the plates by which the order of the blanks during grinding is varied which is desirable under certain conditions.

The means for transverse feeding of the blanks may also be constructed in various ways, for instance, as endless belts arranged at right angles to the grinding passages, reciprocating slides or rotary discs, or the blanks may be fed throughout by an endless cage belt.

In the accompanying drawings, several grinding machines embodying my invention are illustrated by way of example.

Figures 1, 2, 3:
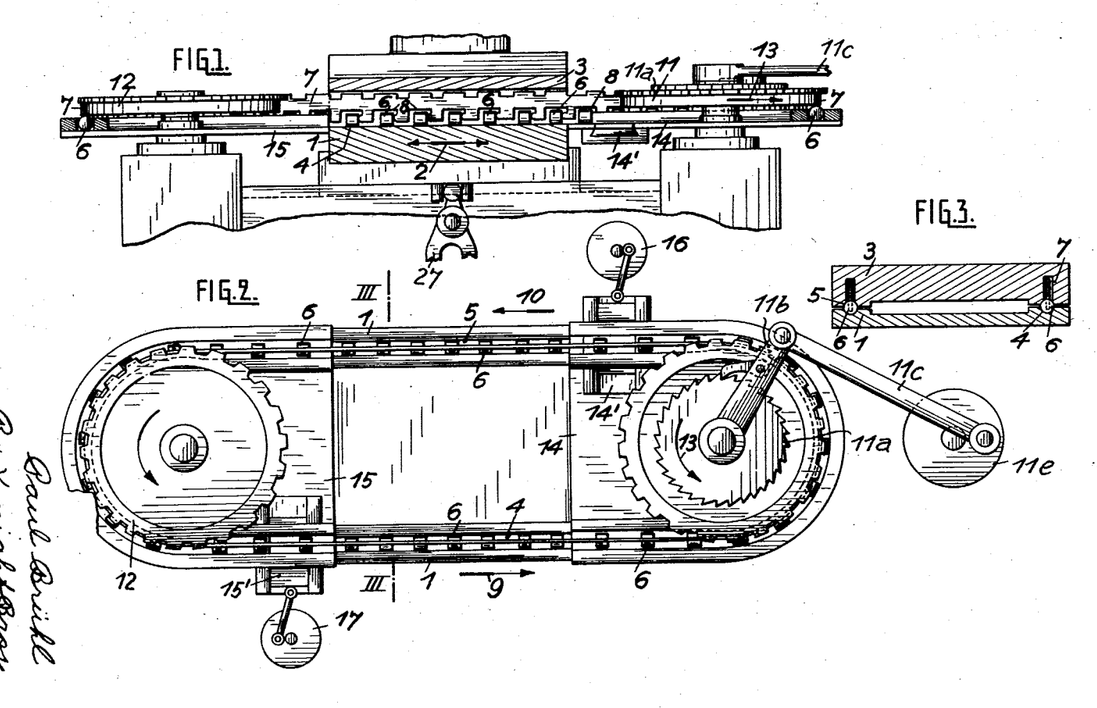
Fig. 1 is an elevation, partly in section, of a grinding machine having an endless belt cage for the blanks, and two passages.
Fig. 2 is a plan view of the machine in Fig. 1, Fig. 2ª is a plan view showing somewhat diagrammatically a machine having four passages.
Fig. 3 is a sectional view taken on line III—III in Fig. 2.

In all figures, 1 is the lower grinding plate and it is assumed that it is reciprocated as indicated by the arrow 2 in Fig. 1 through any suitable medium, for instance a crank 27 to which rocking motion is imparted by known means not shown, and 3 is the upper grinding plate which in this case does not reciprocate but I might provide means for reciprocating the upper plate instead of the lower one, or reciprocation might be imparted to both plates.

Referring now to Figs. 1, 2 and 3, 4 and 5 are parallel grinding passages corresponding in section to the blanks 6 which are referred to as rollers throughout the specification, each grinding plate defining a groove which forms one-half of a passage, 7 is an endless belt "cage" having recesses 8 in its edges for engaging the roller blanks 6, 11 and 12 are sprocket wheels having toothed shrouds for engaging the edges of the belt 7, 11ᵃ is a ratchet wheel on the sprocket 11, 11ᵇ is a ratchet lever and pawl adapted to cooperate with the ratchet wheel 11ᵃ, 11ᶜ is a connecting rod connecting the lever 11ᵇ and crank 11ᵉ which is adapted to operate the ratchet lever 11ᵇ. Intermittent rotation is imparted to the sprocket 11 by the ratchet mechanism in the direction of the arrow 13, Fig. 2, and the belt 7 is moved along the passage 4 in the direction of the arrow 9, and along the passage 5 in the direction of the arrow 10. Obviously, instead of reciprocating motion, continuous motion might be imparted to the belt by suitable means, not shown.

After leaving the passage 4 the rollers 6 are moved about the sprocket 11, and are then delivered to the passage 5 and returned to the passage 4 by the sprocket 12. Flanged tables 14 and 15 are provided to support the rollers 6 where they are unsupported by the passages and sprockets, and where the rollers are engaged from below and rotated by slides 14' and 15' to which reciprocation is imparted by cranks 17 and 18, and connecting rods. Due to this rotation, the position of the rollers with respect to the passage they are going to enter is varied from the passage they have left.

Figure 2A:
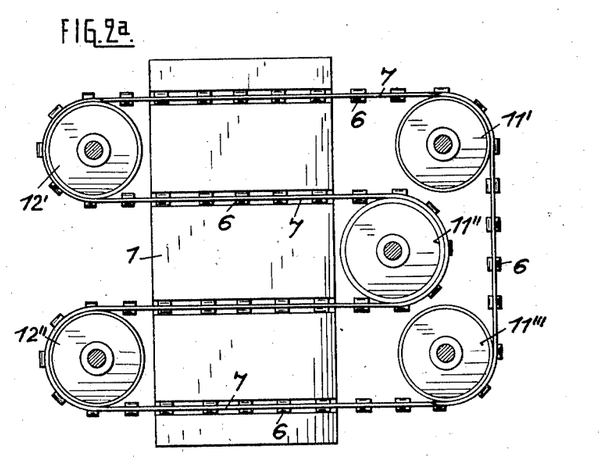

If desired, and as shown in Fig. 2ᵃ, any number of passages may be made in the plates, only the plate 1 being shown in this figure, and sprockets 11', 11'', and 11''', and 12', 12'' are provided for feeding the belt 7 and the rollers 6 through the passages.

Referring now to Figs. 4 to 12, and first to Figs. 9 to 12, six passages are formed in the grinding plates 1 and 3, and three push bars 20, 20', 20'', and 21, 21', 21'', are alotted to each group of three passages 18, 18', 18'', and 19, 19', 19''. The push bars 20 and 21 are secured in cross heads 22 and 23 which are reciprocated on the frame 1ᵃ of the machine as indicated by the arrows 26. Rocking levers 24 and 25 to which reciprocation is imparted by cranks 24ᵃ and 25ᵃ are fulcrumed in the frame 1ᵃ below the cross heads 22, 23, respectively, and engage the crosshead slides with slotted eyes.

Figure 5:
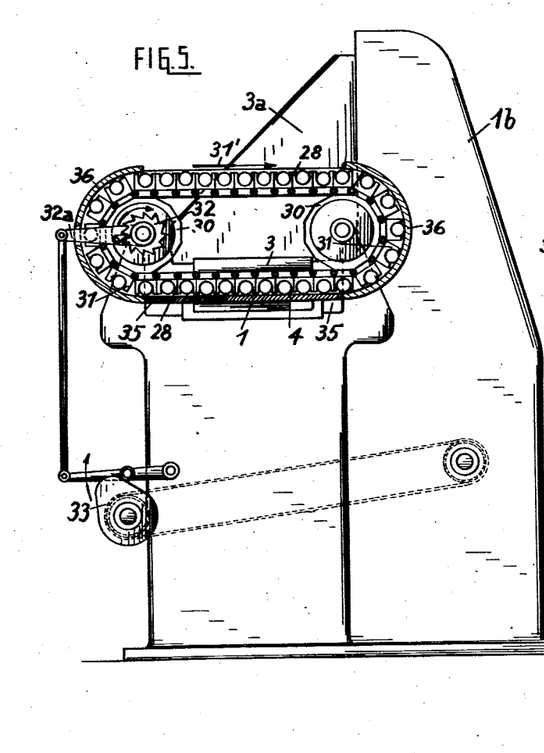
Fig. 5 is an end elevation, partly in section, of the machine in Fig. 4.
Figure 6:
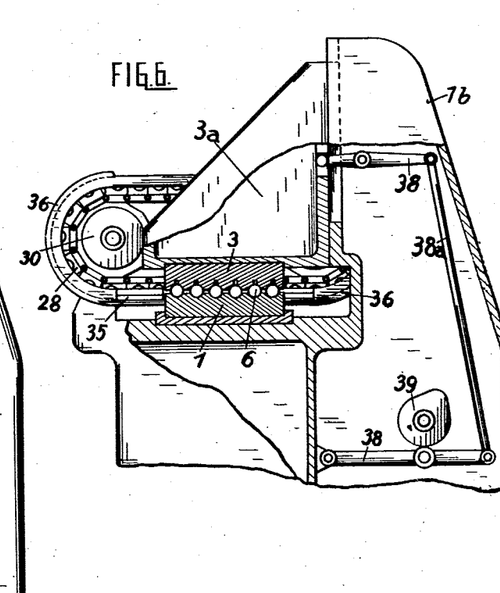
Fig. 6 is a cross section of the machine in Fig. 4, Figs. 7 and 8 are detail part cross sections of the machine in Fig. 4 showing the grinding plates separated and in operative position.

The transverse feed of the rollers 6 which the push bars expel from the passages, is effected by transverse conveyers 28, 29 at either end of the grinding plates 1, 3 which are carried on sprockets 30, as best seen in Fig. 5. Fork-shaped dogs 31 are secured to the belts of the conveyers to engage the rollers, 32 is a ratchet wheel on the shaft of one of the sprockets, 32ᵃ is a ratchet lever co-operating with the ratchet wheel, and 33 is a cam which is connected with the ratchet lever by suitable links and levers, and to which rotation is imparted by a belt or the like from the main driving shaft of the machine, not shown. Tables 34 and 35 are connected with the lower grinding plate 1 and 36 are curved guiding strips adjoining the tables. The rollers are rotated in moving along the tables for the purpose specified when the conveyers 28, 29 are moving as indicated by the arrow 31', Fig. 5. While moving round the sprockets, the rollers are held in place by the strips 36.

Figure 4:
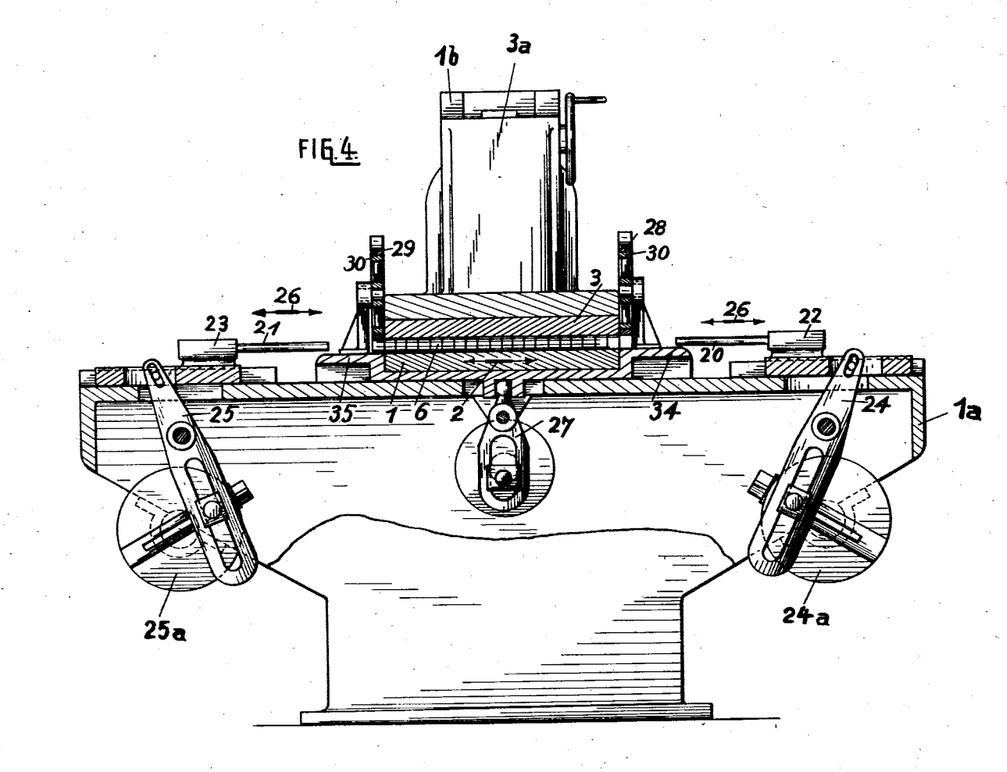
Fig. 4 is an elevation, partly in section, of a machine having push bars for feeding the blanks.
Figure 7:
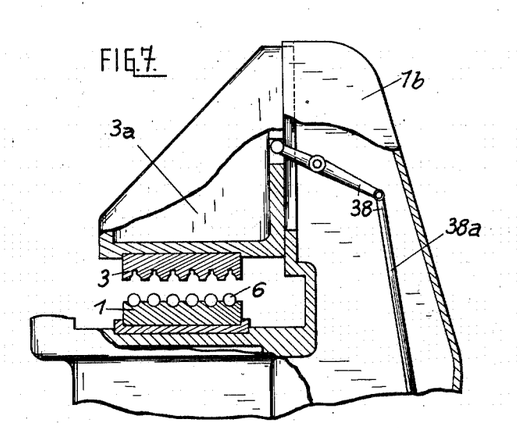
Figure 8:
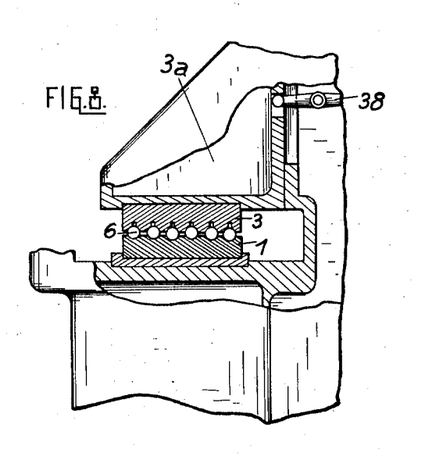

A bracket 3ᵃ is slidably carried in an upright 1ᵇ of the frame 1ᵃ to which bracket the upper grinding plate 3 is secured. Levers 38 are connected by a link 38ᵃ, and 39 is a cam to which rotation is imparted by any suitable means, not shown. The reciprocation of the bracket 3ᵃ and of the push bars 20, 21 is so timed that the upper plate 3 is lifted as soon as new rollers are about to enter any of the grinding passages. The rollers are now free to enter the passages without interference on the part of the grinding plates. Similar means might also be applied to any other type of machine.

Figure 9:
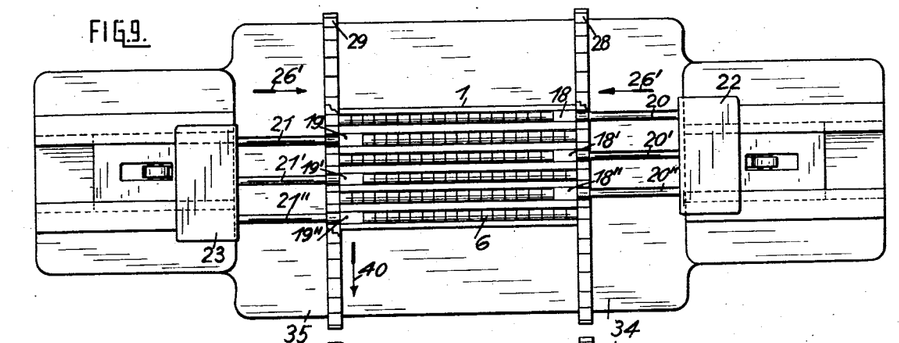
Figs. 9 to 12 are diagrammatic plan views of the machine in Fig. 4, with the upper grinding plate removed, and showing various positions of its push bars.
Figure 10:
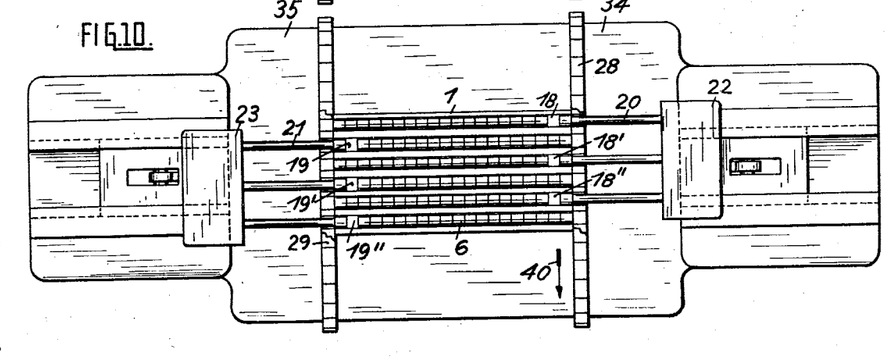
Figure 11:
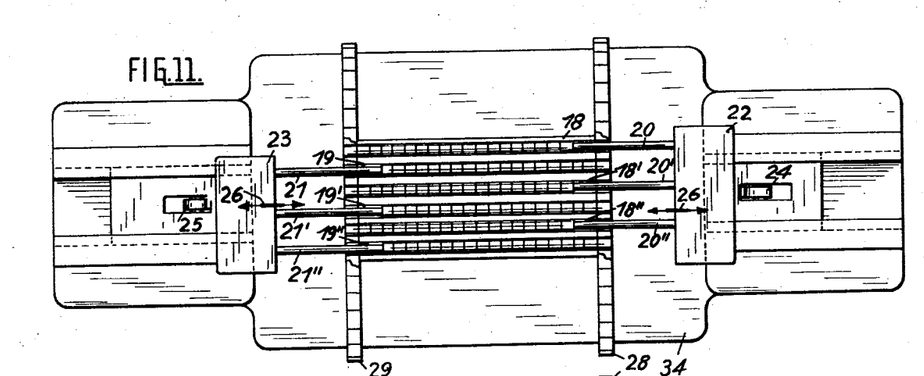
Figure 12:
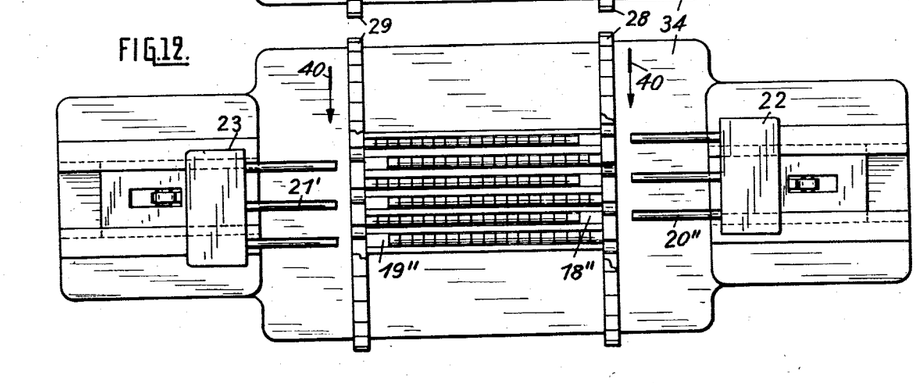

The operation of this machine is as follows: I will assume that the cross heads 22, 23, and their push bars move in opposite directions, though, obviously, they might move in the same direction, if desired. Fig. 9 shows the cross heads 22 and 23 moving in the direction of the arrows 26', 26' and just engaging the rollers which have been fed to them by the conveyers 28, 29, now stationary. Each fork 31 which is in line with one of the push bars, and the corresponding passage, presents a roller 6 to that bar while the upper grinding plate 3 is in raised position. On further inward movement of the push bars, the three push bars 20 will push their rollers into the passages 18, and the three push bars 21 will push their rollers into the passages 19. The upper grinding plate 3 is held raised until each roller has been completely moved into its passage, and is then lowered into its operative position. The inward motion of the cross heads is continued until each row of rollers has been moved into the grinding passages for a distance equal to the length of two rollers. The inward movement of the cross heads and push bars forces one roller from each passage into one of the forks of the conveyers, the three rollers from the passages 18 being delivered to the conveyer 29, and those from the passages 19 to the conveyer 28. While the rollers are fed they are ground. When the grinding has been completed the cross heads 22, 23 are drawn back and the conveyers 28, 29 are fed forward, after having been released by the push bars, for the pitch of two adjacent passages in the direction of the arrows 40, Fig. 12. When the conveyers are stopped the rollers from the passages 18 will now be opposite the passages 19, and the rollers from the passages 19 will be opposite the passages 18. The cross heads now move inwardly again as shown in Fig. 9, and the cycle is repeated.

It follows that each roller which is placed into the passage 18 will move in a serpentine path through all passages until it leaves the passage 19″ whereupon it is fed by the conveyer 28, into its initial position in line with the entrance of passage 18 and is then successively moved through the passages 18, 19, 18′, 19′, 18″, and 19″.

As will appear from the drawing more rollers will be in grinding position between the plates 1, 3 than are outside and so the above-mentioned ratio will be favorable.

When the cross heads 22, 23 move in the same direction instead of moving in opposite directions as described, the speed of the conveyers 28, 29 must be twice that of the example described.

Figure 13:
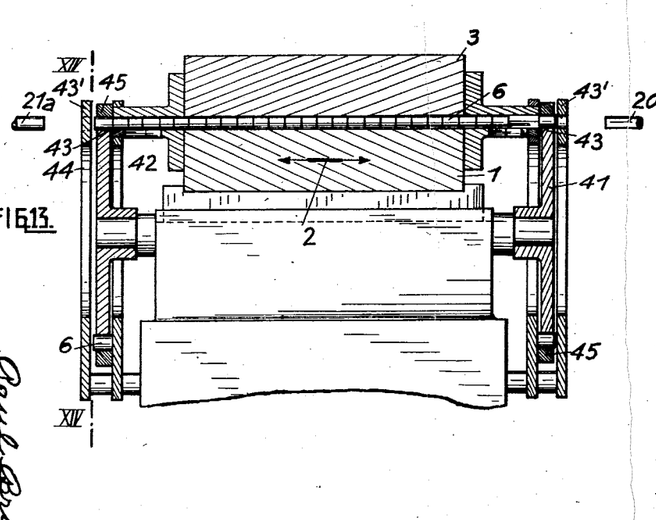
Fig. 13 is an elevation, partly in section, showing a machine having rotary transverse feeding means.
Figure 14:
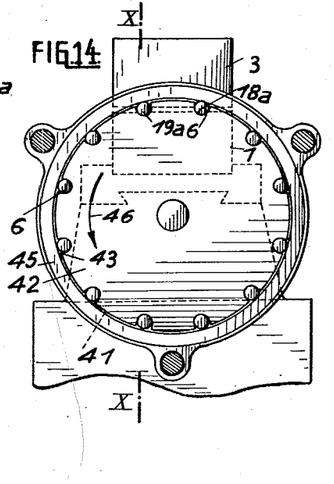
Fig. 14 is a transverse section on the line XIV—XIV in Fig. 13, showing a machine having rotary transverse feeding means.

Referring now to Figs. 13 and 14, the grinding plates 1 and 3 are equipped with two passages 18ª and 19, with a push bar 20ª and 21ª allotted to each. Rotary discs 41 and 42 are at either side of the grinding plates 1, 3, having recesses 43 at their edges for receiving the rollers 6 from the passages. The discs are held between outer rings 43′ which are permanently connected with the frame of the machine, and 45 are rings, also permanently secured, within which the discs 41, 42 rotate, and the rollers 6 are rotated in contact with the ring 45 so as to alter the grinding position of the rollers, as described. The discs 41, 42 are rotated in the direction of the arrow 46, Fig. 14, and at each part of a rotation which the discs perform, the rollers from the passages 18ª, 19 are fed for the pitch of the passages.

Figure 14A:
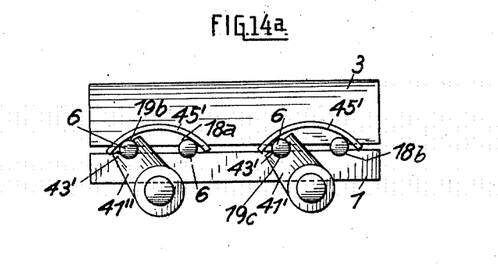

Referring now to Fig. 14ª, instead of the discs 41 and 42 a rocking lever is provided at each side of a pair of passages. In the present instance, two pairs of passages 18ª, 19ᵇ, and 18ᵇ, 19ᶜ are shown, and 41″ and 41′ are the rocking levers allotted to each pair. Recesses 43′ are provided at the ends of the levers, and 45′ are retainers corresponding to the rings 45 in Fig. 13. In rocking the levers feed the rollers from one passage to the other and back so that the rollers quasi circulate through the passages.

Figure 15:
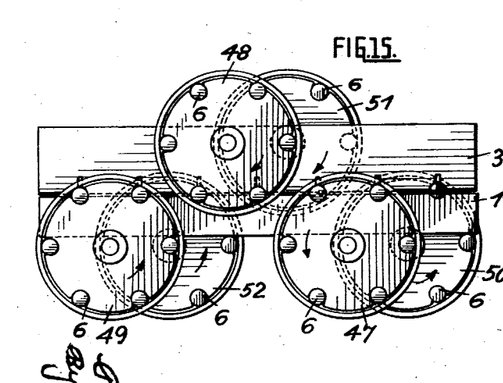
Fig. 15 illustrates a modified feeding means, Figs. 14ᵃ and 15ᵃ illustrate further modifications of transverse feeding means.

Referring now to Fig. 15, seven parallel passages are formed in the plates 1 and 3, and three discs 47, 48, 49 are arranged in staggered relation at one end, and three similar discs 50, 51, 52 are arranged at the other end of the plates, in staggered form. The discs are rotated intermittently as indicated by the arrows. The edges of the discs are recessed for the reception of rollers 6. The rollers expelled from one of the passages by means of push bars, not shown, are transferred by the discs from one passage to the next. Due to the staggered relation of the discs one disc on one side of the plates 1, 3 delivers the rollers to one of the passages through which they are pushed, and which are received at the other end by one of the discs on the opposite side of the plates.

Figure 15A:
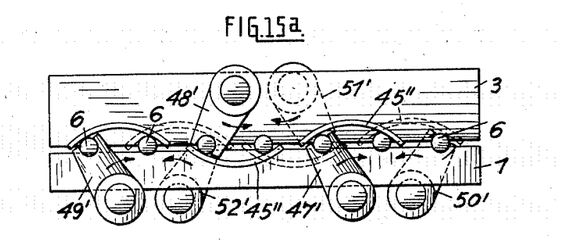

Referring now to Fig. 15ª, this construction is similar to that of Fig. 14ª. In this case the discs shown in Fig. 15 are replaced by as many rocking levers, 47′, 48′, 49′ at one end, and 50′, 51′, 52′ at the other end of the grinding plates 1, 3. The rollers are transferred from one passage to the next along retainers 45″. In the position illustrated in Fig. 15ª, the levers are about to rock as indicated by the arrows and the rollers issuing from one of the passages under the action of the push bars are transferred to the adjacent passage by one of the levers and is received by the corresponding lever at the other end of this passage and transferred to the next passage. In the example illustrated the rollers which have been moved through the passage at the right have moved through all the other passages in a serpentine path.

Referring now to Figs. 16 to 20, the general construction is similar to that described with reference to Figs. 4 to 12 but instead of conveyers, slides 53, 54 are arranged at either end of the plates 1, 3 and are reciprocated as indicated by the arrow 26 by a bell crank lever mechanism generally indicated at 54′. Tables 59 are provided on which the rollers are partly rotated by the slides, for the purpose specified.

Figure 16:
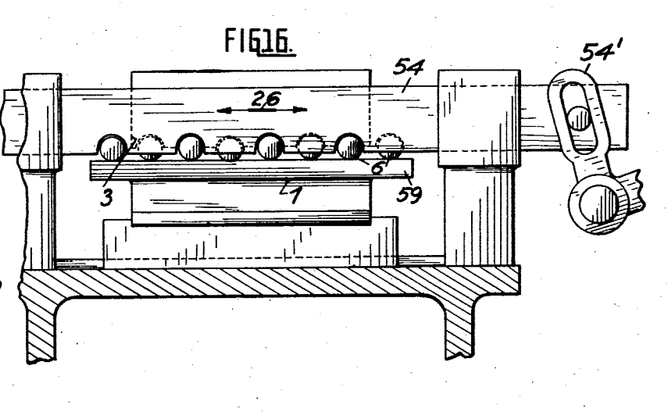
Fig. 16 is an end elevation, partly in section, of a machine having blank-feeding push bars and modified transverse feeding means.

The operation of the cross heads 22 and 23 is similar to that of the corresponding parts described above but in this case the cross heads are supposed to impart motion in the same direction to their respective groups of push bars 20 and 21.

Figure 17:
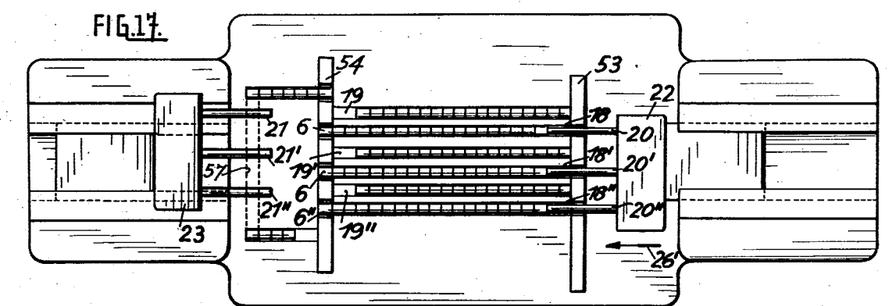
Figs. 17 to 20 are diagrammatic plan views of the machine in Fig. 16, with the upper grinding plate removed, showing various positions of the push bars.
Figure 18:
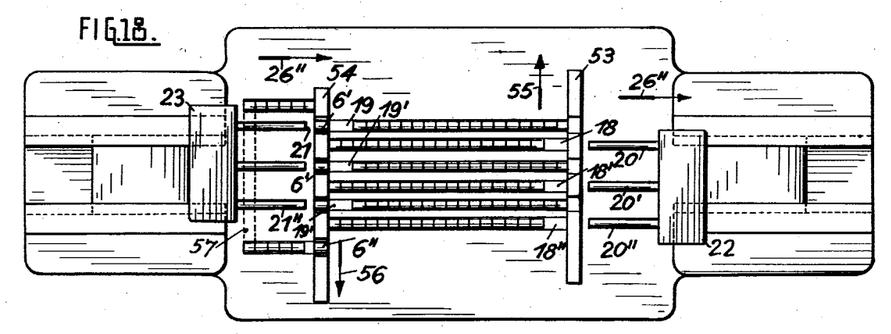
Figure 19:
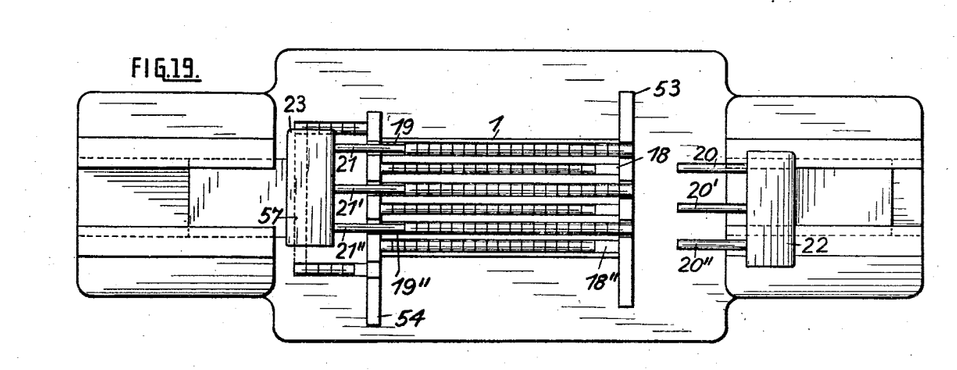
Figure 20:
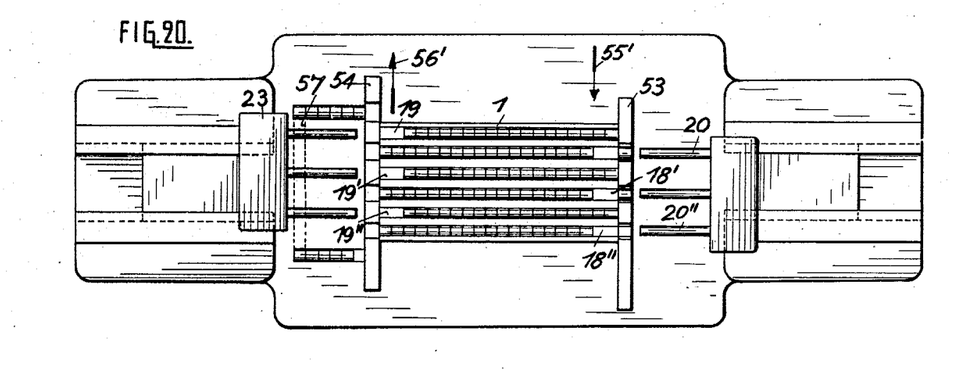

Referring now to Fig. 17, the push bars 20 of the cross head 22 are just at the end of their inward stroke in which they have entered the passages 18 for the length of two rollers 6. Three rollers have been expelled from these passages into the slide 54. The mechanism is now reversed, both groups of push bars moving in the direction of the arrows 26″, Fig. 18. The cross head 22 withdraws its push bars 20, and the cross head 23 advances its push bars 21 into the passages 19. While both groups of push bars are outside their respective passages and beyond the slides 53, 54, the slides move in opposite directions as indicated by the arrows 55 and 56 so that only the rollers which have been delivered to the slide 54 from the passages 18, 18′ and 18″ are registering with the passages 19′ and 19″ while slide 54 has moved a fresh roller 6′ in line with passage 19 and the roller 6″ from the passage 18″ has been removed beyond the reach of the grinding passages. On further movement in the direction of the arrow 26″ the push bars 21 move the rows of rollers through the passages 19 while they are being ground, until they arrive in their final position, Fig. 19, and the last rollers from the passages 19 have been transferred to the slide 53. After this has occurred and the push bars 21 have been again withdrawn from the passages 19 the slides, while both groups of push bars are still withdrawn, move in opposite direction to the arrows 55, 56, that is, in the direction of the arrows 55′, 56′ until at the moment when the push bars 20 re-enter their respective passages, the slides are in the position shown in Fig. 20, in which the rollers which had issued from the passage 19 into the slide 53 are in line with the passages 18 and now are pushed into the passages as shown in Fig. 17, and the cycle is repeated. In this machine as well as in the machines previously described, each roller moves through all passages in succession and it is only necessary in the present instance that the rollers which had been placed in the position 6″ by the slide 54 be successively transferred to the slide 54 into the position 6′, Fig. 18, by suitable means, not shown. Such means which may be separate push bars, or other contrivances, move the rollers along a passage 57.

Another solution to the latter problem is to provide an endless conveyer like 28 or 29, Figs. 4 and 5, instead of the slide 54 at the same time retaining the slide 53.

The machine illustrated in Figs. 16 to 20 has the advantage that the number of rollers outside the grinding passages is still smaller than in the other machines described.

The means for conveying rollers along the passage 57 might be so designed that only a single roller, or a few rollers, is present in the passage 57 which very rapidly move from the position in 6″ to that in 6′ and the ratio of rollers being ground would be very high in such a machine.

I claim:

1. A grinding machine comprising grinding means defining a plurality of passages, sets of push bars allotted to sets of said passages, means for reciprocating said sets of push bars in said passages, and transverse feeding means at either end of said passages adapted to receive the blanks from said passages and to move them forward through the pitch of said passages.

2. A grinding machine comprising grinding means defining a plurality of passages, endless conveyer belts arranged for intermittent movement at either side of said passages, blank-engaging means on said belts, and stationary plates arranged in such relation to said conveyer belts as to impart rotation to the blanks while they are being moved past them by said conveyers.

3. A grinding machine comprising grinding means defining a plurality of passages, means for feeding blanks through said passages, reciprocating blank-engaging slides arranged for intermittent operation at either side of said passages, and stationary plates arranged in such relation to said slides as to impart rotation to said blanks while they are being moved past them by said slides.

4. A grinding machine comprising grinding means defining a plurality of passages, means for feeding blanks through said passages, blank engaging rocking levers arranged for intermittent operation at either side of said passages, and stationary guides arranged in concentric relation to said rocking levers so as to impart rotation to the blanks while they are being moved past said guides by said levers.

5. A grinding machine comprising grinding means defining a plurality of passages, means for feeding blanks through said passages, blank engaging rocking levers arranged for intermittent operation at either side of said passages in staggered relation, and stationary guides arranged in concentric relation to said rocking levers so as to impart rotation to the blanks while they are being moved past them by said levers.

6. A grinding machine for the grinding of rollers comprising grinding means having a plurality of straight passages defined therein, and means for feeding a roller successively through all of said passages.

7. A grinding machine for the grinding of rollers comprising a pair of grinding plates, said plates having a plurality of straight passages defined therein, and means for feeding blanks successively through all of said passages.

8. A grinding machine for the grinding of rollers comprising grinding means having a plurality of straight passages defined therein, means for feeding rollers through each of said passages, and means for feeding said rollers from one of said passages to another of said passages.

9. A grinding machine for the grinding of rollers comprising grinding means having a plurality of straight passages defined therein, means for feeding rollers through each of said passages, means for feeding said rollers from one of said passages to another of said passages, and means for imparting rotation to said rollers intermediate said passages.

10. A grinding machine for the grinding of rollers comprising grinding means having a plurality of straight passages defined therein, means for feeding a roller successively through all of said passages, and means for changing the grinding position of said roller intermediate said passages.

11. A grinding machine for the grinding of rollers comprising grinding means having a plurality of straight passages defined therein, means for feeding rollers through one of said passages, means for feeding said rollers from said last-named passage to another of said passages, means for feeding said rollers through said last-named passage, and means for rotating said rollers between said first-named passage and said last-named passage.

12. A grinding machine for the grinding of rollers according to claim 6, in which each roller is fed through each passage with its faces in a position reverse to that in which the roller was fed through the preceding passage.

13. A grinding machine for the grinding of rollers comprising grinding means having a plurality of straight passages defined therein, and means for positively feeding and guiding a roller successively through all of said passages.

14. A grinding machine for the grinding of rollers comprising a pair of grinding plates having a plurality of straight passages defined therein, means for feeding a roller through each of said passages, and means for laterally displacing said roller transversely to its direction of forward movement from the exit of one of said passages to the entrance of another of said passages.

15. In a grinding machine for the grinding of rollers, a pair of grinding plates having a plurality of straight passages defined therein, and means for feeding rollers successively through all of said passages, said means comprising a plurality of pulleys lying in a plane parallel to the plane of said passages, an endless cage band running through all of said passages and guided by said pulleys, and means for driving said cage band through the intermediation of one of said pulleys.

16. A grinding machine for the grinding of rollers as described in claim 6, in which tables are provided intermediate the passages over which the rollers are guided between passages, and means are provided for reciprocating said table transverse to the axes of said rollers as the latter pass over said table.

17. A grinding machine for the grinding of rollers comprising a pair of grinding plates having a plurality of straight passages defined therein, two groups of rams for feeding rollers associated with said passages and arranged at opposite ends of said passages in staggered relationship to one another, means for moving said groups of rams in and out of said passages, and means for moving each roller ejected from said passages by said rams to the entrance of another passage when said rams are withdrawn from said passages.

18. A grinding machine for the grinding of rollers according to claim 8, in which said last-named means comprises an endless intermittently driven conveyor belt and a guiding strip associated thereto at each end of said grinding plates, said belt having recesses adapted to receive the rollers as they are ejected from the passages, said rollers receiving a partial rotation in passing over said guiding strip from one passage to another.

19. A grinding machine for the grinding of rollers according to claim 8, in which said last-named means comprises a reciprocating pusher the direction of movement of which is transverse to the longitudinal axis of the passages, the rollers in being pushed from the exit of one passage to the entrance of another passing over a table whereby the rollers receive a partial rotation.

20. A grinding machine for the grinding of rollers according to claim 8, in which said last-named means comprises intermittently driven discs arranged at right angles to the passage, said discs being provided on their peripheral surfaces with recesses for the reception of the rollers issuing from the passages, and stationary casing rings so associated with said discs that said rollers will roll during the rotation of said discs.

21. A grinding machine for grinding rollers comprising a pair of grinding plates having a plurality of straight passages defined therein, means for feeding rollers through each of said passages, and a plurality of discs at each end of said passages arranged transversely to said passages in staggered relation for intermittent simultaneous rotation, each of said discs being adapted to receive rollers from one of said passages and to convey them to another of said passages.

22. A grinding machine for the grinding of rollers as described in claim 21, in which the peripheral surfaces of said discs are provided with recesses for said rollers, and a casing is associated with said peripheral surfaces against which said rollers abut so that when said discs are rotated said rollers roll within their respective recesses.

23. A grinding machine for the grinding of rollers comprising a pair of grinding plates having a plurality of straight passages defined therein, means for feeding rollers through each of said passages, means for separating and bringing together said grinding plates in time with said feeding means, and transverse feeding means adapted to receive rollers from said passages and to move them forward through the pitch of said passages.

In testimony whereof I affix my signature.

PAUL BRÜHL.